UNITED STATES PATENT OFFICE.

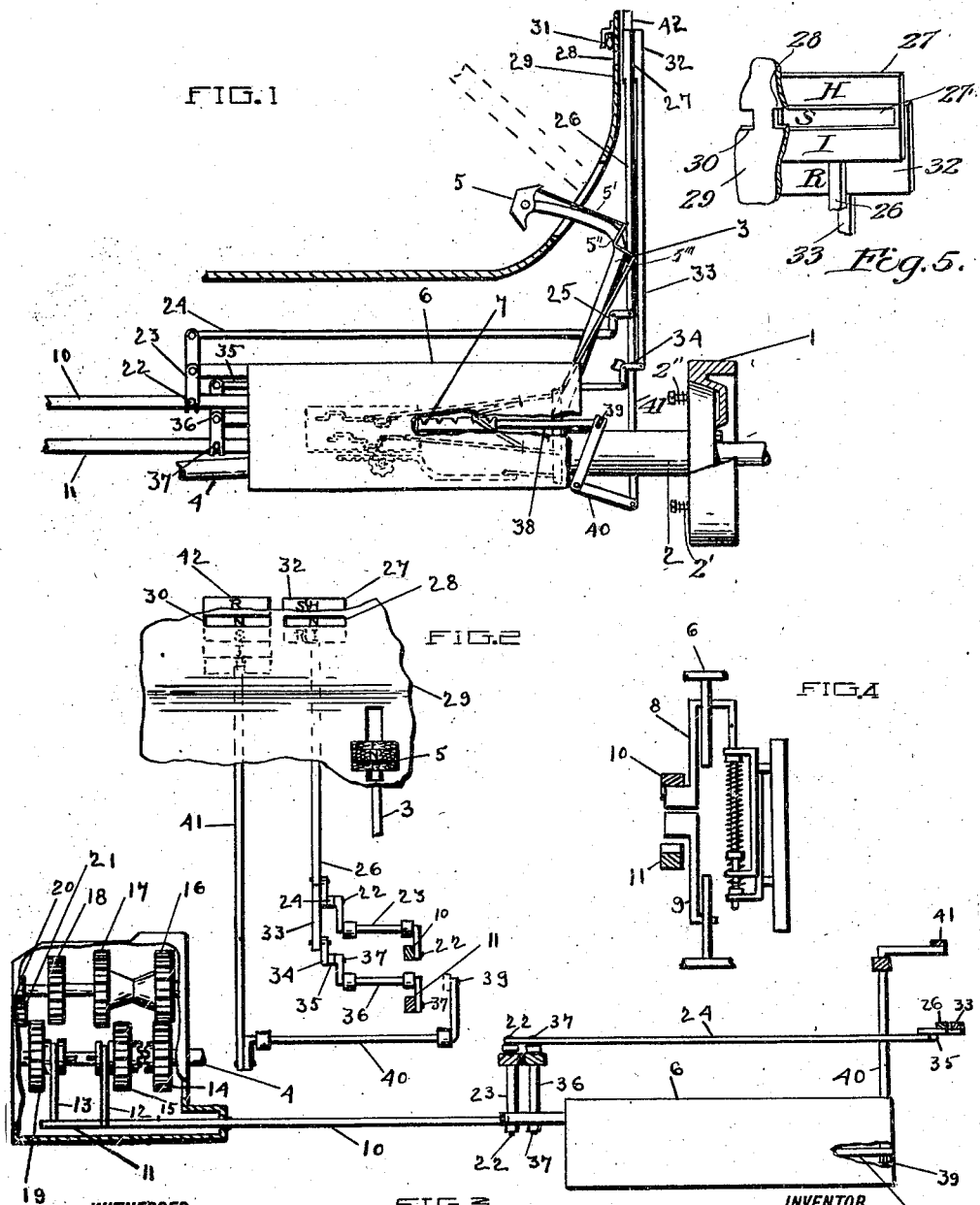

HUBERT A. MYERS, OF TOLEDO, OHIO, ASSIGNOR OF ONE-HALF TO ALBERT A. ATWOOD, OF TOLEDO, OHIO.

CHANGE-SPEED-GEARING INDICATOR.

1,167,098.

Specification of Letters Patent. Patented Jan. 4, 1916.

Application filed April 20, 1914. Serial No. 833,294.

*To all whom it may concern:*

Be it known that I, HUBERT A. MYERS, a citizen of the United States of America, residing at Toledo, Lucas county, Ohio, have invented new and useful Change-Speed-Gearing Indicators, of which the following is a specification.

This invention relates to indicating mechanism for disclosing the relation of the driving elements and the position of the driving elements actuating means in a transmission device.

This invention has utility in connection with gearing control, especially with progressive shifting means for changing the speed as adapted to motor vehicles.

Referring to the drawings: Figure 1 is a side elevation of the device as incorporated in connection with a motor vehicle showing a fragment of the vehicle in section; Fig. 2 is a fragmentary view of the dash or front of the motor vehicle and features of the indicating mechanism; Fig. 3 is a plan view of the speed changing device and the connection of the indicating mechanism thereto; Fig. 4 is a fragmentary view of the actuating means determining and effecting the travel of the shiftable members and Fig. 5 is a fragmentary perspective view of the indicator device disclosing the gears as shifted to slow or first speed forward.

The motor vehicle may have its motor drive the flywheel 1 and the sleeve 2 may be connected to or disconnected from this flywheel 1 by the clutch 2' actuated thereto-ward by the springs 2'' and away therefrom by the lever 3 to effect driving or freeing of the main shaft 4. The clutch lever 3 has the rockable tread 5 provided with connecting means 5', 5'', 5''' to the housing 6 for determining the reciprocation of the actuating means 7 by engaging the dog 8 or 9 with a shiftable member 10 or 11. These reciprocable shiftable members 10, 11, engage the forks 12, 13, respectively, in the gear housing to shift the gears for the desired speed relation, which in the instance shown may be high when the clutch is directly connected between the gear wheels 14 and 15, and intermediate or second speed forward when connected through the gear 16, 17, to the gear 15; slow forward when the drive is through the gear 14, 16, 18, 19, and reverse when the drive is through the gears 14, 16, 20, 21, 19. The position of the transmission device as shown in Fig. 3 is at neutral or disconnected position.

The position of the indicators is shown as neutral. In the instance in which the shiftable member 10 is connected for high speed driving the pin 22 will actuate the bell crank lever 23 to move the link 24, the angle lever 25 and the link 26 to draw down the plate 27 so that High is displayed through the window 28 in the dash 29, Fig. 2. Above these windows 28, 30, in the dash 29 may be disposed the electric light 31 clearly illuminating the indicator so that the position of the transmission device may be determined at a glance at any time whether the machine is running or idle. This is of considerable importance when emergencies arise along the road or in starting or stopping the machine. Should the reciprocation of the shiftable member 10 be in the opposite direction, the plate 27 would be thrust up from its central position to show Intermediate as the speed relation connected for the transmission device. The plate 27 has the central position therein open forming the window 27' to disclose therebehind the plate 32 to be actuated by the link 33, angle lever 34, link 35, bell crank lever 36 engaging the pin 37 on the shiftable member 11. This plate 32 in the central position displays Neutral indication through the window 28 and the opening 27' in the plate 27. A shifting of this shiftable member 11 into Forward or into Slow position will draw the plate 32 down to display Slow indication through the window 28, while shifting of the member 11 rearward to connect with the reverse driving relation will thrust this plate 32 upward to display the Reverse indication through the window 28.

Connected to the actuating means 7 is the extension 38 with the pin 39 engaging the bell crank lever 40 connected by the link 41 to the plate 42 movable to display indications through the window 30 in the dash 29. This display indication from the actuating means embodies the complete scale upon a single plate and is a check up as to the position of the actuator at each shifting and should corroborate the position of the shift members 10, 11.

The invention of this disclosure has especial adaptation in connection with speed relation control devices of the progressive type or a type in which a common member is used for effecting the various relations, being a check on such member and an assistance to the operator in ascertaining what may follow in making a change in the driving relation of the transmission device.

What is claimed and it is desired to secure by Letters Patent, is:

1. A speed changing device, a shiftable member therefor, means for shifting the member, and an indicator connected to the member to be movable relatively thereto but simultaneously with the member to disclose the position of the member.

2. A speed changing device, a control member therefor, actuating means for the member, and an indicator connected to the means to be actuated thereby and relatively thereto to disclose the position of the means.

3. A speed changing device, a shiftable member for effecting a speed change in the device, means for shifting the member, and an indicator connected to be actuated by the means and relatively thereto to disclose the speed change relation of the speed changing device.

4. A speed changing device, an actuating device therefor, and an indicator connected to the actuating device and movable thereby relatively thereto to disclose the position of the actuating means.

5. A speed changing device embodying a pair of shiftable members, an actuating device for the members, indicator means actuable by the actuating device to disclose the position of said shiftable members.

6. A speed changing device embodying a pair of shiftable members, an actuating device for the members, and indicator means connected to the actuating device to be actuated thereby to disclose the position of the actuating device.

7. A speed changing device embodying a pair of shiftable members, an actuating device for the members including a movable element, first indicator means connected to be actuated by the shiftable members, and second indicator means connected to be actuated by the movable element of the actuating device.

8. A speed changing device, actuating means therefor embodying a single foot lever for establishing a plurality of driving relations, and an indicator coöperating with the actuating means for disclosing the driving relation of the device.

9. Indicating means embodying a pair of indication disclosing elements, one disposed in front of the other, the front element having an opening therein to disclose the other element position therethrough, and a speed changing device connected to the means to actuate the means for disclosing the driving speed of the device.

In witness whereof I affix my signature in the presence of two witnesses.

HUBERT A. MYERS.

Witnesses:
  GEO. E. KIRK,
  C. H. RAUCH.